United States Patent
Zack et al.

(10) Patent No.: US 9,520,051 B1
(45) Date of Patent: Dec. 13, 2016

(54) SYSTEM AND METHOD FOR IMPLEMENTING PERSONAL EMERGENCY RESPONSE SYSTEM BASED ON UWB INTERFEROMETER

(71) Applicant: ECHOCARE TECHNOLOGIES LTD., Beer Sheva (IL)

(72) Inventors: Rafi Zack, Kiryat-Ono (IL); Yossi Kofman, Raanana (IL)

(73) Assignee: ECHOCARE TECHNOLOGIES LTD., Beer Sheva (IL)

( * ) Notice: Subject to any disclaimer, the term of this patent is extended or adjusted under 35 U.S.C. 154(b) by 10 days.

(21) Appl. No.: 14/753,062

(22) Filed: Jun. 29, 2015

(51) Int. Cl.
*G08B 1/08* (2006.01)
*G08B 25/01* (2006.01)

(52) U.S. Cl.
CPC .................. *G08B 25/016* (2013.01)

(58) Field of Classification Search
CPC .................. G01S 13/06; A61B 5/021
USPC .......... 340/539.11, 539.13, 539.22, 870.04,340/545.6; 342/22, 28, 128, 129, 133
See application file for complete search history.

(56) References Cited

U.S. PATENT DOCUMENTS

| | | | | |
|---|---|---|---|---|
| 7,903,020 B2* | 3/2011 | Lin | .......................... | A61B 5/05 342/22 |
| 8,779,965 B2* | 7/2014 | Sentelle | .................. | G01S 13/32 242/128 |
| 2014/0070958 A1* | 3/2014 | Foo | ...................... | A61B 5/0205 340/870.07 |
| 2015/0301167 A1* | 10/2015 | Sentelle | ............... | A61B 5/0205 342/22 |

* cited by examiner

*Primary Examiner* — Tai Nguyen
(74) *Attorney, Agent, or Firm* — Pearl Cohen Zedek Latzer Baratz LLP

(57) ABSTRACT

A non-wearable Personal Emergency Response System (PERS) architecture is provided, having a synthetic aperture antenna based RF interferometer followed by two-stage human state classifier and abnormal states pattern recognition. In addition, it contains a communication sub-system to communicate with the remote operator and centralized system for multiple users' data analysis. The system is trained to learn the person's body features as well as the home environment. The decision process is carried out based on the instantaneous human state (Local Decision) followed by abnormal states patterns recognition (Global decision). The system global decision (emergency alert) is communicated to the operator through the communication system and two-ways communication is enabled between the monitored person and the remote operator. In some embodiments, a centralized system (cloud) receives data from distributed PERS systems to perform further analysis and upgrading the systems with updated database (codebooks).

14 Claims, 9 Drawing Sheets

VQ States Definition

| State Number | State name | Location | Human Centroid Level from Floor | Posture | Movement | Motions | Breathing [Resp/Min] | Time Limit [Minutes] |
|---|---|---|---|---|---|---|---|---|
| S20 | On floor | NA | <0.5 | Horizontal,Ball | No | Minor | Normal | 5 |
| S21 | Sleeping | Bedroom | >0.5 | Horizontal | No | Minor | Normal | Daylight-180 Night-480 |
| S22 | Sleeping | Livingroom | >0.5 | Horizontal | No | Minor | Normal | Daylight-180 Night-480 |
| S23 | Sitting @ toilet | Restroom | 1 | Zigzag | No | Minor | Normal | 20 |
| S24 | Sitting | NA | 1 | Zigzag | No | Minor | Normal | 180 |
| S25 | Standing | NA | >1.5 | Vertical | No | No | Normal | 60 |
| S26 | Walking | NA | >1.5 | Vertical | Yes | Yes (Gait) | Normal | 30 |
| S27 | Falling | NA | <0.5 | NA | No | Yes | Abnormal | NA |
| S28 | Stress | NA | NA | NA | NA | Yes | Very High | 30 |
| S29 | Bath | Bathroom | >0.5/>1/5 | Zigzag/Vertical | No | Yes | Normal | 30 |

States Matrix

| State\Location | 1-bedroom | 2-Bathroom | 3-Restroom | 4-kitchen | 5-Livingroom | 6-other |
|---|---|---|---|---|---|---|
| 1-On floor | | | | | | |
| 2-Sleeping | X | | | | | |
| 3-Sitting | | | | | | |
| 4-Standing | | | | | | |
| 5-Walking | | | | | | |
| 6-"Falling" (Vertical motion) | | | | | | |
| 7. Stress | | | | | | |

CSA States Patterns

| Situation | State1 | State2 | State3 | State4 | State5 | Pattern Repetitions |
|---|---|---|---|---|---|---|
| Critical Fall 1 | S25 | S45 | S65 | S15 | S75 | 1 |
| Critical Fall 2 | S42 | S62 | S12 | S72 | X | 1 |
| Critical Fall 3 | S51 | S61 | S11 | X | X | 1 |
| Critical Fall 4 | S35 | S45 | S65 | S15 | S75 | 1 |
| High Restroom usage | S31 | S51 | S33 | S51 | S31 | >5 |
| Sedentary1 | S35 | X | X | X | X | >Time Thresh |
| Sedentary2 | S35 | S75 | X | X | X | 1 |

SYSTEM AND METHOD FOR IMPLEMENTING PERSONAL EMERGENCY RESPONSE SYSTEM BASED ON UWB INTERFEROMETER

FIELD OF THE INVENTION

The present invention relates to the field of elderly monitoring, and more particularly, to a system architecture for personal emergency response system (PERS).

BACKGROUND OF THE INVENTION

Elderly people have a higher risk of falling, for example, in residential environments. As most of elder people will need immediate help after such a fall, it is crucial that these falls are monitored and addressed upon in real time. Specifically, one fifth of falling elders are admitted to hospital after staying on floor for over one hour following a fall. The late admission increases the risk of dehydration, pressure ulcers, hypothermia, and pneumonia. Acute falls leads to high psychological effect of fear and high impact on daily life quality.

Most of the existing personal emergency response systems (PERS), which take the form of fall detectors and alarm buttons, are wearable devices. These wearable devices have several disadvantages. First, they cannot recognize the human body positioning and posture.

Second, they suffer from limited acceptance and use due to: Elders' perception and image issues, high rate of false alarms and miss-detects, elders neglect re-wearing when getting out of bed or bath, and, and long term usage of wearable might lead to user skin irritations. Third, the wearable PERS are used mainly after experiencing a fall (very limited addressable market).

Therefore, there is a need for a paradigm shift toward automated and remote monitoring systems.

SUMMARY OF THE INVENTION

Some embodiments of the present invention provide a unique sensing system and a breakthrough for the supervision of the elderly during their stay in the house, in general, and detect falls, in particular. The system may include: a UWB-RF Interferometer, Vector Quantization based Human states classifier, Cognitive situation analysis, communication unit and processing unit.

According to some embodiments of the present invention, the system may be installed in the house's ceiling, and covers a typical elder's apartment with a single sensor, using Ultra-Wideband RF technology. It is a machine learning based solution that learns the elder's unique characteristics (e.g., stature, gait and the like) and home primary locations (e.g. bedroom, restroom, bathroom, kitchen, entry, etc.), as well as the home external walls boundaries.

According to some embodiments of the present invention, the system may automatically detect and alert emergency situation that might be encountered by elders while being at home and identify the emergency situations.

According to some embodiments of the present invention, the system may detect falls of elderly people, but may also identify other emergencies situations, such as labor briefing, sleep apnea, as well as other abnormal cases, e.g., sedentary situation, repetitive non-acute falls that are not reported by the person. It is considered as a key element for the elderly connected smart home, and, by connecting the system to the network and cloud, it can also make a use of big data analytics to identify new patterns of emergencies and abnormal situations.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is a table illustrating an exemplary states definition in accordance with some embodiments of the present invention;

FIG. 5 is a table illustrating an exemplary states matrix in accordance with some embodiments of the present invention;

FIG. 6 is a table illustrating an exemplary abnormal patterns in accordance with some embodiments of the present invention.

Figure 1:
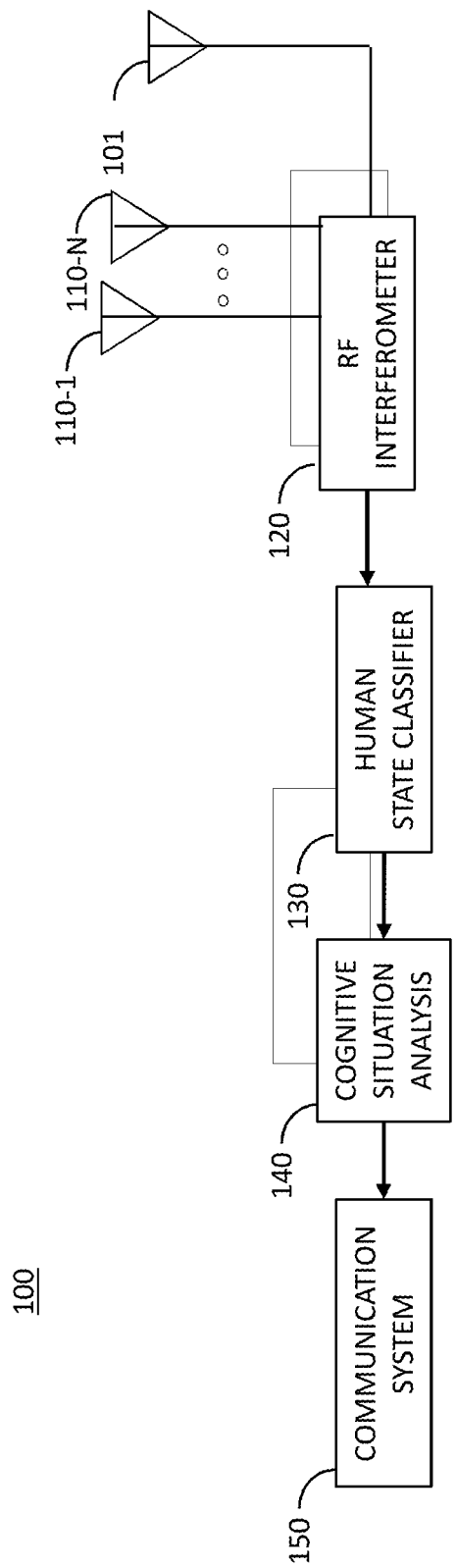
FIG. 1 is a block diagram illustrating a non-limiting exemplary architecture of a system in accordance with embodiments of the present invention

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a block diagram illustrating a non-limiting exemplary architecture of a system 100 in accordance with embodiments of the present invention. System 100 may include a radio frequency (RF) interferometer 120 configured to transmit signals via Tx antenna 101 and receive echo signals via array 110-1 to 110-N. It should be noted that transmit antennas and receive antennas may take different form and according to a preferred embodiment, in each antenna array they may be a single transmit antenna and several receive antennas. An environmental clutter cancelation module may or may not be used to filter out static non-human related echo signals. System 100 may include a human state feature extractor 130 configured to extract from the filtered echo signals, a quantified representation of position postures, movements, motions and breathing of at least one human located within the specified area. A human state classifier may be configured to identify a most probable fit of human current state that represents an actual human instantaneous status. System 100 may include a abnormality situation pattern recognition module 140 configured to apply a pattern recognition based decision function to the identified states patterns and determine whether an abnormal physical event has occurred to the at least one human in the specified area. A communication system 150 for communicating with a remote server and end-user equipment for alerting (not shown here). Communication system 150 may further include two-way communication system between the caregiver and the monitored person for real-time assistance.

Figure 2:
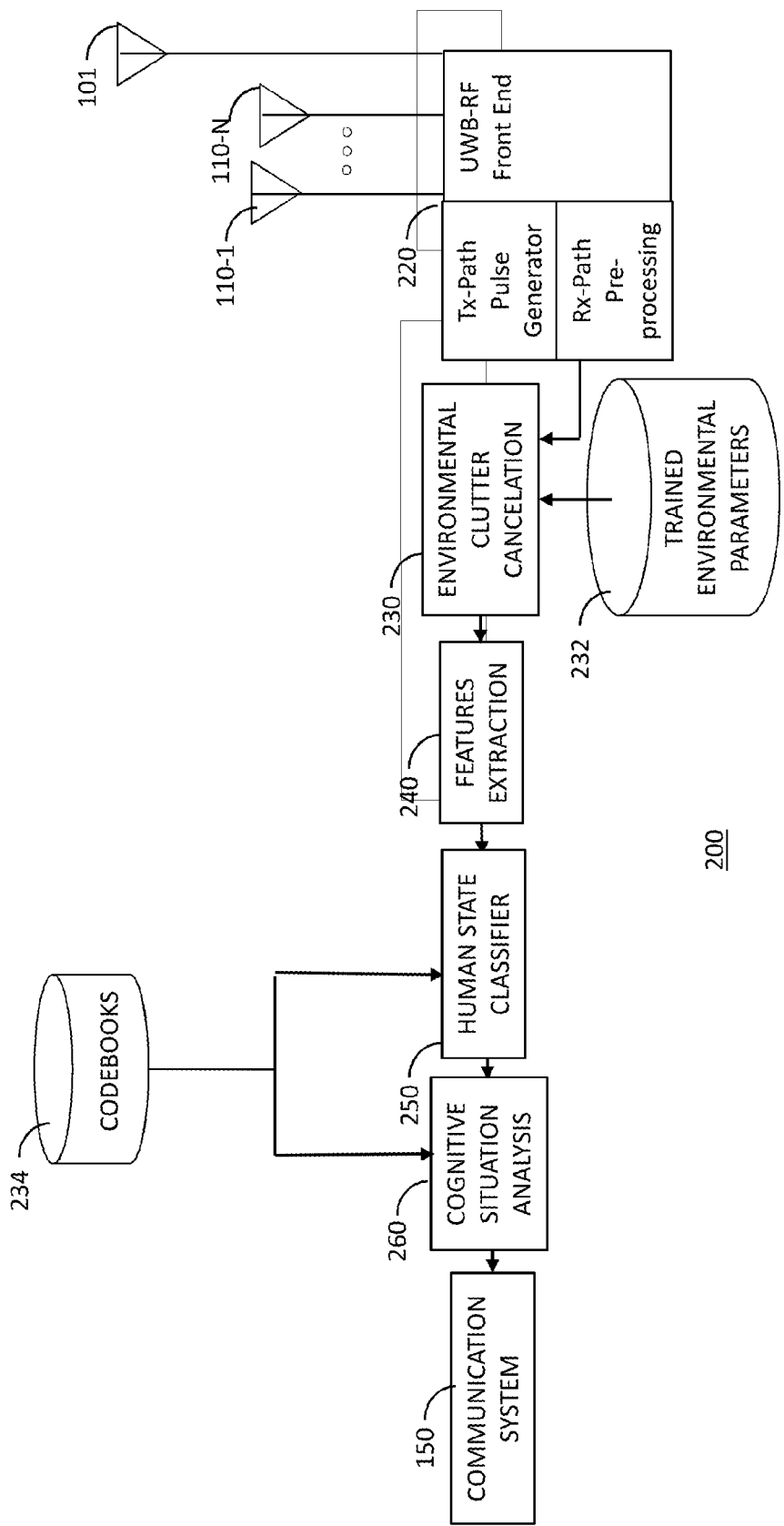
FIG. 2 is another block diagram illustrating the architecture of a system in further details in accordance with embodiments of the present invention.

FIG. 2 is another block diagram illustrating the architecture of a system in further details in accordance with some embodiments of the present invention as follows:

UWB-RF interferometer 220—this unit transmits an Ultra wideband signal (e.g., pulse) into the monitored environment and receives back the echo signals from multiple antenna arrays to provide a better spatial resolution by using the Synthetic Antenna Aperture approach. In order to increase the received signal-to-noise (SNR), the transmitter sends multiple UWB pulse and receiver receives and integrates multiple echo signals (processing gain). The multiple received signals (one signal per each Rx Antenna) are sampled and digitally stored for further signal processing.

Environmental Clutter Cancelation 230. The echo signals are pre-processed to reduce the environmental clutter (the unwanted reflected echo components that are arrived from the home walls, furniture, etc.). The output signal mostly contains only the echo components that reflected back from the monitored human body. Environmental Clutter Cancelation 230 is fed with the trained environmental parameters 232. In addition, the clutter cancelation includes a stationary environment detection (i.e., no human body at zone) to retrain the reference environmental clutter for doors or furniture movement cases.

Feature extraction 240—The "cleaned" echo signals are then processed to extract the set of features that will be used to classify the instantaneous state of the monitored human person (e.g. posture, location, motion, movement, breathing). The set of the extracted features constructs the feature vector that is the input for the classifier.

Human state classifier 250—The features vector is entered to a Vector Quantization based classifier that classifies the instantaneous features vector by statistically finding the closest pre-trained state out of a set of N possible states, i.e., finding the closest code vector (centroid) out of all code vectors in a codebook 234. The classifier output is the most probable states with its relative probability (local decision).

Cognitive Situation Analysis (CSA) 260—This unit recognizes whether the monitored person is in an emergency or abnormal situation. This unit is based on a pattern recognition engine (e.g., Hidden Markov Model—HMM, based). The instantaneous states with their probabilities are streamed in and the CSA search for states patterns that are tagged as emergency or abnormal patterns, such as a fall. These predefined patterns are stored in a patterns codebook 234. If case that CSA recognizes such a pattern, it will send an alarm notification to the healthcare center or family care giver through the communication unit (e.g., Wi-Fi or cellular).

Two-way voice/video communication unit 150—this unit may be activated by the remote caregiver to communicate with the monitored person when necessary.

The UWB-RF interferometer unit 220 may include the following blocks:

Two-Dimensional UWB antenna array 110-1-110-N to generate the synthetic aperture through all directions, followed by antenna selector.

UWB pulse generator and Tx RF chain to transmit the pulse to the monitored environment UWB Rx chain to receive the echo signals from the antenna array followed by analog to digital converter (ADC).

The sampled signals (from each antenna) are stored in the memory, such as SRAM or DRAM.

In order to increase the received SNR, the RF interferometer repeats the pulse transmission and echo signal reception per each antenna (of the antenna array) and coherently integrates the digital signal to improve the SNR.

Environmental Clutter Cancelation

The environmental clutter cancelation is required to remove the unwanted echo components that are reflected from the apartment's static items as walls, doors, furniture, etc.

The clutter cancelation is done by subtracting the unwanted environmental clutter from the received echo signals. The residual clutter represents the reflected echo signals from the monitored human body.

According to some embodiments of the present invention, the clutter cancelation also includes stationary environment detection to detect if no person at the environment, such as when the person is not at home, or is not at the estimated zone. Therefore, a periodic stationary clutter check is carried out and new reference clutter fingerprint is captured when the environment is identified as stationary.

The system according to some embodiments of the present invention re-estimates the environmental clutter to overcome the clutter changes due to doors or furniture movements.

Multiple Features Extraction

The "cleaned" echo signal vectors are used as the raw data for the features extraction unit. This unit extracts the features that mostly describe the instantaneous state of the monitored person. The following are examples for the set of the extracted features and the method it's extracted:

Position—the position is extracted as the position (in case of 2D—angle/range, in case of 3D—x,y,z coordinates) metrics output of each array baseline. The actual person position at home will be determined as a "finger print" method, i.e., the most proximity to the pre-trained home position matrices (centroids) codebook.

Posture—the person posture (sitting, standing, and laying) will be extracted by creating the person "image" by using, e.g., a back-projection algorithm.

Both position and posture are extracted, for example, by operating, e.g., the Back-projection algorithm on received echo signals—as acquired from the multiple antennas array in SAR operational mode.

The following is the used procedure to find the human position and posture:

Dividing the surveillance space into voxels (small cubic) in cross range, down range and height Estimating the reflected EM signal from a specific voxel by the back projection algorithm Estimating the human position by averaging the coordinates of the human reflecting voxels for each baseline (Synthetic Aperture Antenna Array).

Triangulating all baselines' position to generate the human position in the environment Estimating the human posture by mapping the human related high-power voxels into the form-factor vector Tracking the human movements in the environment (bedroom, restroom, etc.)

Human motion—The monitored human body may create vibrations and other motions (as gestures and gait). Therefore, it introduces frequency modulation on the returned echo signal. The modulation due to these motions is referred to as micro-Doppler (m-D) phenomena. The human body's motion feature is extracted by estimating the micro-Doppler frequency shift vector at the target distance from the system (down range).

Human breathing—During the breathing (respiration) the chest wall moves. The average respiratory rate of a healthy adult is usually 12-20 breaths/min at rest (~0.3 Hz) and 35-45 breaths/min (~0.75 Hz) during labored breathing. The breathing frequency feature is extracted by estimating the spectrum on the slow-time sampled received echo signal at the target distance (down range) from the system.

The features vector is prepared by quantizing the extracted features with a final number of bits per field and adding the time stamp for the prepared vector. This vector is used as the entry data for the human state classifier (for both training and classifying stages).

Human State Classifier

The Human state classifier is a VQ (Vector Quantization) based classifier. This classifier consists of two main phases:

Training phase—it's done offline (supervised training) and online (unsupervised training), where a stream of features vectors reflecting various states are used as a preliminary database for vector quantization and finding the set of code-vectors (centroids) that sufficiently representing the instantaneous human states. The set of the calculated code-vectors are called codebook. Some embodiments of the training sessions are provided in more details hereinafter.

Classifying phase—it's executed during the online operation while an unknown features vector is entered into the classifier and the classifier determines what the most probable state that it represents. The classifier output is the determined states and the set of the measured statistical distances (probabilities), i.e., the probability of State—i given the observation—O (the features vector). The aforementioned probability scheme may be formulated by: P(Si|O). The determined instantaneous state is called "Local Decision".

The VQ states are defined as the set of instantaneous states at various locations at the monitored home environment. Therefore, any state is a 2 dimension results which is mapped on the VQ state matrix.

The State matrix consists of the state (row) and location (Column) followed by a time stamp. Typical elderly home environment consists of the specific locations (Primary zones) and others non-specified locations (Secondary zones). State is defined as the combination of posture/motion at a specific location (e.g. S21 will indicate sleeping at Bedroom).

Figure 3:
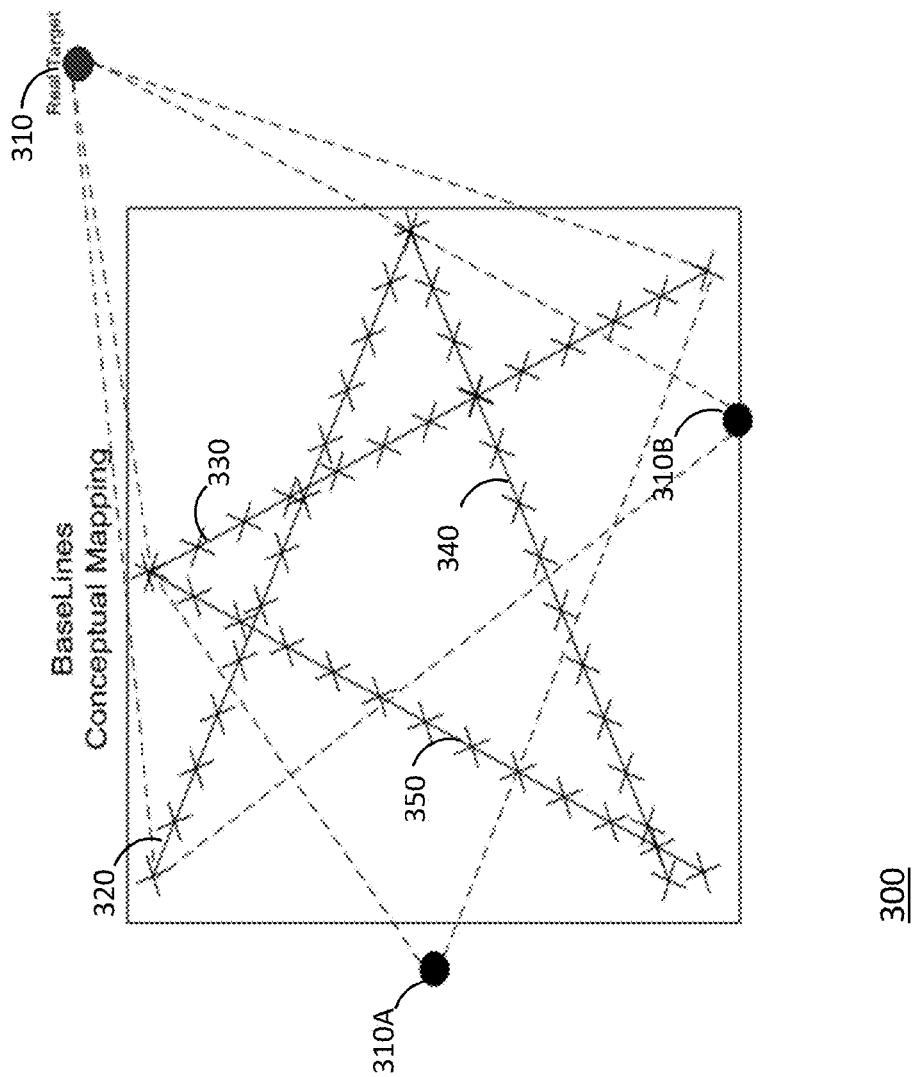
FIG. 3 is a diagram illustrating conceptual 2D Synthetic Aperture Antennas arrays in accordance with some embodiments of the present invention.

FIG. 3 is a diagram illustrating conceptual 2D Synthetic Aperture Antennas arrays in accordance with some embodiments of the present invention. Antenna array system 300 may include several arrays of antennas 320, 330, 340, and 350. Each row may have at least one transmit antenna and a plurality of receive antennas. The aforementioned non-limiting exemplary configuration enables to validate a location of a real target 310 by eliminating the possible images 310A and 310B after checking reflections received at corresponding arrays of antennas 330 and 320, respectively. It is well understood that the aforementioned configuration is a non-limiting example and other antennas configurations may be used effectively.

FIG. 4 is a table 400 illustrating an exemplary states definition in accordance with some embodiments of the present invention.

FIG. 5 is a table 500 illustrating an exemplary states matrix in accordance with some embodiments of the present invention.

Cognitive Situation Analysis (CSA)

The CSA's objective is to recognize the abnormal human patterns according to a trained model that contains the possible abnormal cases (e.g., fall). The core of the CSA, in this embodiment, may, in a non-limiting example a Hidden Markov Model (HMM) based pattern recognition.

The CSA engine searches for states patterns that are tagged as an emergencies or abnormal patterns. These predefined patterns are stored in a patterns codebook.

The output of the CSA is the Global recognized human situation.

FIG. 6 is a table 600 illustrating exemplary abnormal patterns in accordance with some embodiments of the present invention. It can be seen that in the first abnormal case (Critical fall), it appears that the person was sleeping in the leaving room (S25), then was standing (S45) and immediately fell down (S65). He stayed on floor (S15) and start being in stress due to high respiration rate (S75).

The CSA may contain additional codebook (irrelevant codebook) to identify irrelevant patterns that might mislead the system decision.

Communication Unit

The communication unit creates the channel between the system and the remote caregiver (family member or operator center). It may be based on either wired (Ethernet) connectivity or wireless (e.g., cellular or WiFi communication or any other communication channel).

The communication unit provides the following functionalities:
1. This unit transmits any required ongoing situation of the monitored person and emergency alerts.
2. It enables the two way voice/video communication with the monitored person when necessary. Such a communication is activated either automatically whenever the system recognizes an emergency situation or remotely by the caregiver.

3. It enables the remote system upgrades for both software and updated codebooks (as will be in further detail below)

Figure 7:
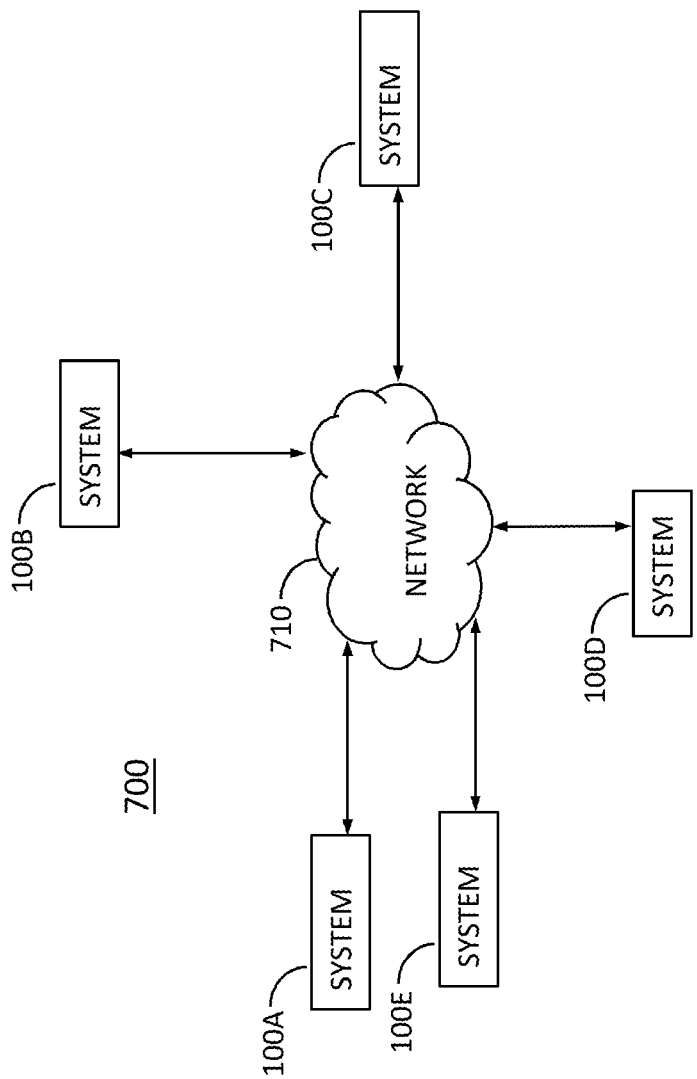
FIG. 7 is a diagram illustrating a cloud based architecture of the system in accordance with embodiments of the present invention.

4. It enables the communication to the centralized system (cloud) to share common information and for further big data analytics based on multiple deployments of such innovated system FIG. 7 is a diagram illustrating cloud-based architecture 700 of the system in accordance with embodiments of the present invention. Raw data history (e.g., states stream) is passed from each local system 100A-100E to the central unit located on a cloud system 710 and performs various data analysis to find correlation of states patterns among the multiple users' data to identify new abnormal patterns that may be reflected just before the recognized abnormal pattern. New patterns code vectors will be included to the CSA codebook and cloud remotely updates the multiple local systems with the new code-book. The data will be used to analyze daily operation of local system 100A-100E.

Figure 8:
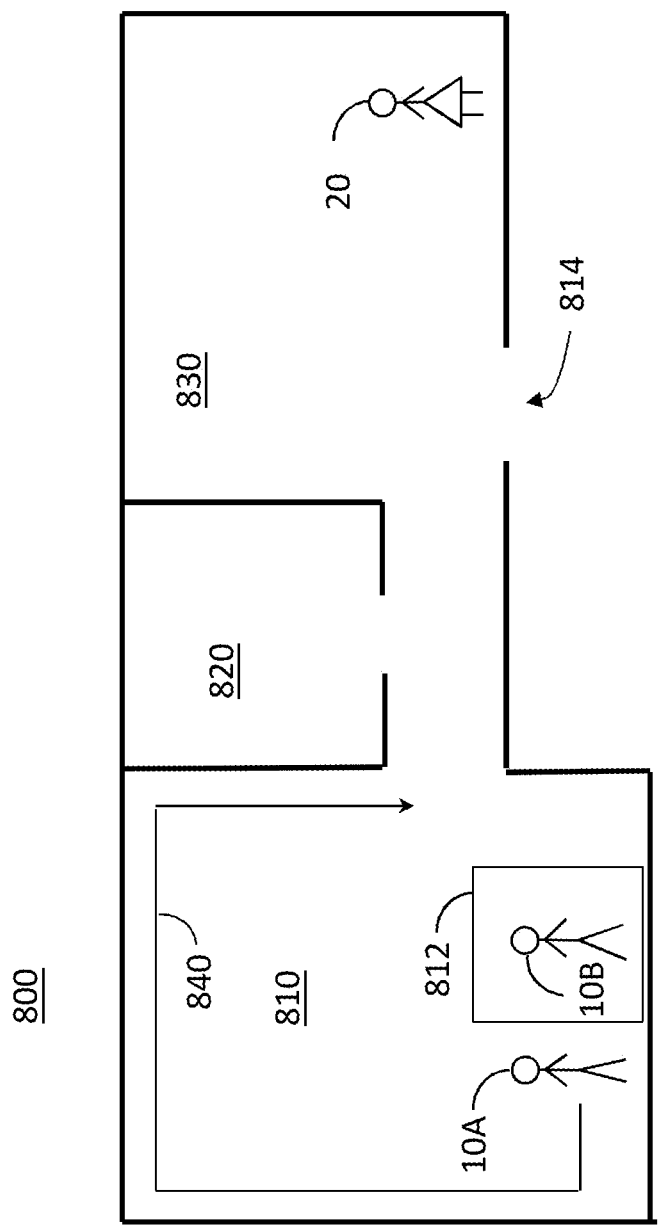
FIG. 8 is a floor plan diagram illustrating initial monitored person training as well as the home environment and primary locations training in accordance with embodiments of the present invention.

FIG. 8 is a diagram illustrating a floor plan 800 of an exemplary residential environment (e.g., an apartment) on which the process for the initial training is described herein. The home environment is mapped into the primary zones (the major home places that the monitored person attends most of the time as bedroom 810, restroom 820, living room 830 and the like) and secondary zones (the rest of the barely used environments).

The VQ based human state classifier (described above) is trained to know the various primary places at the home. This is done during the system setup while the installer 10A (being the elderly person or another person) stands or walks at each primary place such as bedroom 810, restroom 820, and living room 830 and let the system learns the "finger print" of the echo signals extracted features that mostly represents that place. These finger prints are stored in the VQ positions codebook.

In addition, the system learns the home external walls boundaries. This is done during the system setup while the installer stands at various places along the external walls and let the system tunes its power and processing again (integration) towards each direction. For example, in bedroom 810, installer 10A may walk along walls in route 840 so that the borders of bedroom 810 are detected by tracking the changes in the RF signal reflections throughout the process of walking. A similar border identification process can be carried out in restroom 820, and living room 830.

Finally, the system learns to identify the monitored person 10B. This is done by capturing the finger print of the extracted features on several conditions, such as (1) while the person lays at the default bed 812 (where he or she is supposed to be during nighttime) to learn the overall body volume (2) while the person is standing to learn the stature, and (3) while the person walks to learn the gait.

All the captured cases are stored in the VQ unit and are used to weight the pre-trained codebooks and to generate the specific home/person codebooks.

According to some embodiments, one or additional persons such as 20 can also be monitored simultaneously. The additional person can be another elderly person with specific fingerprint or it can be a care giver who needs not be monitored for abnormal postures.

Figure 9:
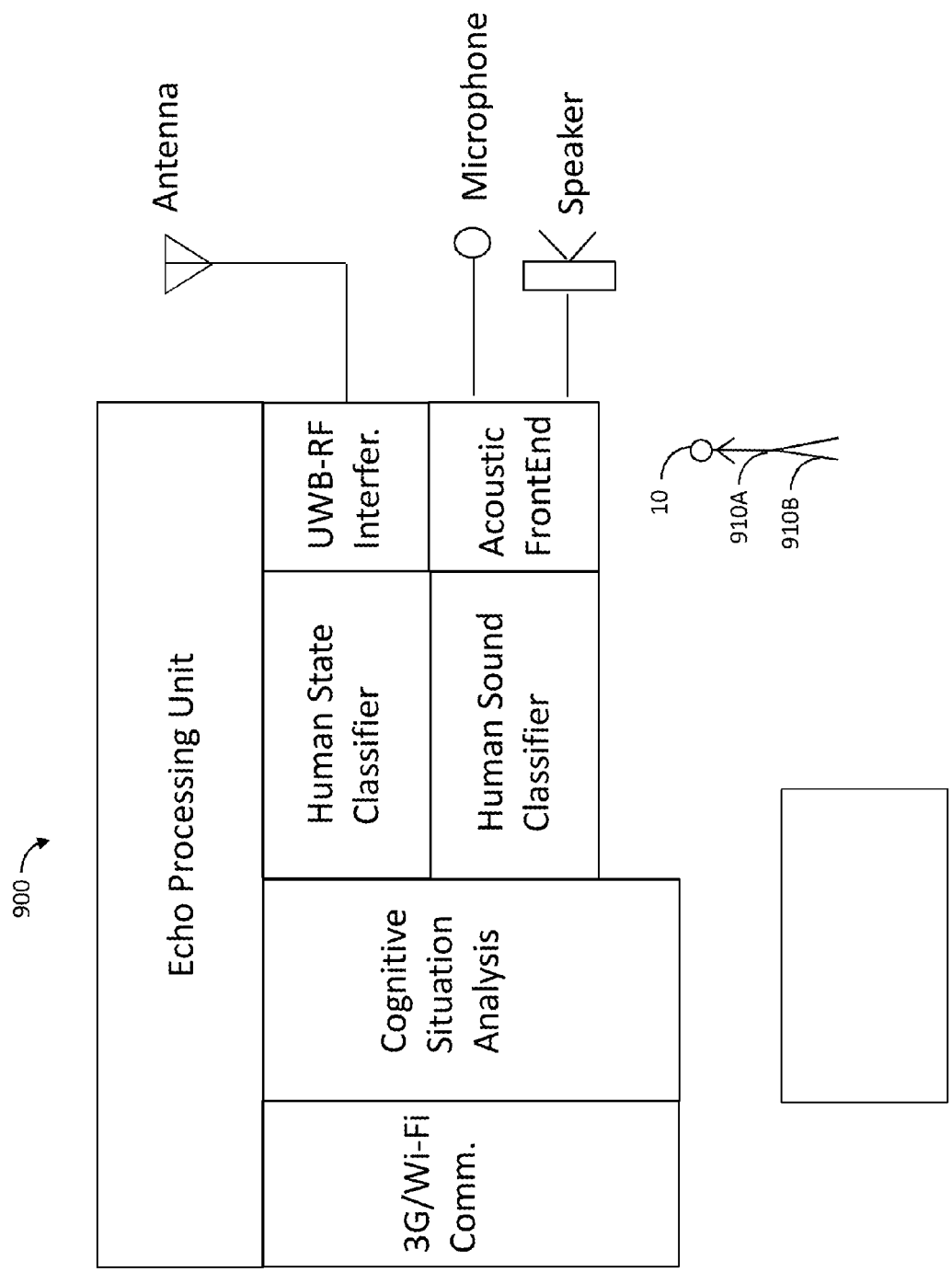
FIG. 9 is a diagram illustrating yet another aspect in accordance with some embodiments of the present invention.

FIG. 9 is a diagram illustrating yet another aspect in accordance with some embodiments of the present invention. System 900 is similar to the system described above but it is further enhanced by the ability to interface with at least one wearable medical sensor 910A or 910B coupled to the body of human 10 configured to sense vital signs of human 10, and a home safety sensor 920 configured to sense ambient conditions at said specified area, and wherein data from said at least one sensor are used by said decision function for improving the decision whether an abnormal physical event has occurred to the at least one human in said specified area. The vital signs sensor may sense ECG, heart rate, blood pressure, respiratory system parameters and the like. Home safety sensors may include temperature sensors, smoke detector, open door detectors and the like. Date from all or some of these additional sensors may be used in order to improve the decision making process described above.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A non-wearable monitoring system comprising:
    a radio frequency (RF) interferometer configured to transmit signals at a specified area and receive echo signals via an antenna array;
    an environmental clutter cancelation module configured to filter out static non-human related echo signals;
    a human state feature extractor configured to extract from the filtered echo signals, a quantified representation of position postures, movements, motions and breathing of at least one human located within the specified area;
    a human state classifier configured to identify a most probable fit of human current state that represents an actual human instantaneous, wherein the extracted features are vector quantized, and wherein the classifier is configured to find a best match to a codebook which represents the current state being a set of human instantaneous condition/situation which is based on said quantized feature status; and
    an abnormality situation pattern recognition module configured to apply a pattern recognition based decision function to an identified states patterns and determine whether an abnormal physical event has occurred to the at least one human in the specified area.

2. The system according to claim 1, wherein the RF interferometer is an ultra-wide band (UWB) RF interferometer which includes: a multiple synthetic aperture antennas arrays; UWB pulse generator, UWB transmitter and UWB receiver configured to capture echo signal from every antenna and every array.

3. The system according to claim 1, wherein the environmental clutter cancelation module comprises a static environment detector configured to ensure that no human body at the environment, static clutter estimator and static clutter subtraction.

4. The system according to claim 1, wherein the human state features extractor comprises: a back-projection unit configured to estimate the reflected clutter from a specific voxel to extract the human position and posture features; a Doppler estimator configured to extract the human motions and breathing features; and a features vector generator configured to create a quantized vectors of the extracted features.

5. The system according to claim 1, wherein the human state classifier comprises a training unit configured to quantize a known states features vectors and generate a state code-vectors; a distance function configured to measure a distance between unknown tested features vectors and pre-defined known code-vectors; and a classifier unit configured to find a best fit between unknown tested features vector and pre-determined code-vectors set, classifier output consisting of a most probable state and the relative statistical distance to the tested features vector.

6. The system according to claim 1, wherein the abnormality pattern recognition module comprises: a training unit configured to generate a set of abnormal states patterns as a reference codebook, and set of states transition probabilities, and states patterns matching function to find and alert on a match between a tested states pattern and the pre-defined abnormal pattern of the codebook.

7. The system according to claim 1, further comprising a communication sub-system configured to communicate an alert upon determining of an abnormal physical event.

8. The system according to claim 7, wherein the communication sub-system comprises: a signaling link configured to transmit the system alerts to far end, a two way voice and video communication to interact with the monitored person, and two-way data link to remotely upgrade the system.

9. The system according to claim 7, further comprising a remote centralized data analyzing unit comprising: a data collection unit to receive the monitoring and alerts units' data, data analyzer to find new abnormal patterns based on multiple users situations, abnormal patterns codebook generator to update the codebook with the new abnormal patterns.

10. The system according to claim 1, configured to operate with similar systems in a master-slave configuration in which the RF interferometer and set of antennas are configured to act as a repeater communicating between at least two systems.

11. The system according to claim 1, wherein parameters obtained in a training sequence are used to configure the human state classifier per a specific person.

12. The system according to claim 11, wherein the trained environmental parameters are calculated by monitoring a human in various locations and positions in a predefined order.

13. The system according to claim 6, wherein the abnormal patterns reference codebook is remotely updated with new abnormal patterns received from data analysis by multiple users.

14. The system according to claim 1, wherein the system further includes an interface with at least one of: a wearable medical sensor configured to sense vital signs of the human, and a home safety sensor configured to sense ambient conditions at said specified area, and wherein data from said at least one sensor are used by said decision function for improving the decision whether an abnormal physical event has occurred to the at least one human in said specified area.

* * * * *